United States Patent [19]

Perrotta

[11] 4,210,540

[45] Jul. 1, 1980

[54] IMPROVED FILTER TUBE

[75] Inventor: Kenneth A. Perrotta, Methuen, Mass.

[73] Assignee: Whatman Reeve Angel Limited, Maidstone, England

[21] Appl. No.: 931,864

[22] Filed: Aug. 7, 1978

Related U.S. Application Data

[62] Division of Ser. No. 803,026, Jun. 3, 1977, Pat. No. 4,102,785.

[51] Int. Cl.$^2$ ............................................. B01D 29/10
[52] U.S. Cl. ................................ 210/497 R; 210/504; 210/505; 210/507; 210/509
[58] Field of Search .............. 210/504, 505, 496, 509, 210/508, 507, 483, 486, 488, 492, 447 R, 497.1, 500 R, 65, 506; 427/340, 341, 385 R, 385 C, 390 A, 398 R

[56] References Cited

U.S. PATENT DOCUMENTS

| 3,442,391 | 5/1969 | Bozck | 210/497 |
|---|---|---|---|
| 3,709,721 | 1/1973 | King | 427/390 A |
| 3,972,694 | 8/1976 | Head | 210/504 |
| 3,993,827 | 11/1976 | Dukert et al. | 427/390 A |

*Primary Examiner*—Ronald N. Smith
*Assistant Examiner*—Janyce A. Bell
*Attorney, Agent, or Firm*—Richard P. Crowley

[57] ABSTRACT

A glass-fiber filter tube and process of preparing the filter tube, which filter tube comprises a plurality of randomly disposed, fine glass fibers bonded, at the junction of the fibers, with a fused thermoplastic fluorocarbon resin, which filter tube may also include a reinforcing support scrim sheet incorporated integrally therein.

12 Claims, No Drawings

IMPROVED FILTER TUBE

This is a division of application Ser. No. 803,026, filed June 3, 1977, now U.S. Pat. No. 4,102,785.

BACKGROUND OF THE INVENTION

Glass-fiber filter tubes have been employed for the filtration of gas or liquid streams, and typically have been composed of a plurality of interrelated, randomly disposed, glass fibers bonded into a self-supporting filter tube at the junction of the fiber crossover points by a variety of bonding agents. One class of bonding agents has been composed of inorganic material, such as silica sols. Another class of bonding agents comprises organic thermosetting-type resins. The filter tube is impregnated with the thermosetting or curable resin by immersing the dry filter tube into a solution containing the thermosetting resin, and, thereafter, heating the tube to drive off any volatile organic solvents and to effect the cross-linking or condensation of the organic resin. Thermosetting or cured resins employed as binders include phenol-formaldehyde resins, epoxy resins and silicone resins (see, for example, U.S. Pat. Nos. 3,767,054 and 3,972,694, both hereby incorporated by reference in their entirety).

Although such resin bonding agent are satisfactory for many purposes, filter tubes containing such resin binders often cannot be employed in certain applications, such as, for example, the filtration of halogen, such as liquid chlorine, or very strong mineral acid or highly oxidizing solutions. It is, therefore, desirable to provide an improved filter tube having a bonding agent which has substantially high chemical inertness.

In addition, it is also desirable to provide filter tubes of high and improved collapse strength and/or burst strength. The burst strength of glass-fiber filter tubes is improved by incorporating therein an integral, cooperative-bonded, open, reinforcing, scrim sheet material, such as an open-mesh, glass-fiber sheet. For Example, a helical coil of mesh material bonded within the walls of the filter tube improves the burst strength of a glass-fiber filter tube (see U.S. patent application Ser. No. 679,569, filed Apr. 23, 1976, now U.S. Pat. 4,102,785, issued July 25, 1978, hereby incorporated reference in its entirety). However, even improved and higher burst strengths of filter tubes than those described in the patent application, supra, are desirable, in order to avoid the necessity of employing separate external support screens (or internal support cores for improved collapse strength) at high fluid pressures, and for use of the filter tubes directly on compressed air lines at 100 to 125 psi or over.

SUMMARY OF THE INVENTION

My invention concerns an improved filter tube, the process of preparing such filter tube and the process of using such filter tube. In particular, my invention relates to an improved, nonwoven, glass-fiber filter tube having a fused thermoplastic fluorocarbon resin as the bonding agent. My invention is also directed to the preparation of improved filter tubes by impregnating the filter tube with an emulsion of the bonding agent, particularly a latex emulsion of a fluorocarbon resin. In addition, my invention concerns the filter tubes and the process of preparing such tubes containing a scrim material, and having exceptionally high burst strength.

My improved filter tube comprises a plurality of interrelated, randomly disposed fibers, particularly glass fibers, having interstices therebetween to define the porosity of the filter as desired. The fibers have an average diameter ranging from about 0.01 to about 10 microns or higher. In its preferred embodiment, my tube employs a fused thermoplastic resin bonding agent, particularly a fluorocarbon resin, with the fibers interrelated and bonded by the fused bonding agent to form a semirigid, porous, self-supporting filter tube. The glass fibers employed may have an average diameter range, for example, of from about 0.03 to 8 microns, such as from about 0.1 to 5.0 microns, with borosilicate glass fibers being the preferred glass fibers employed in my filter tube.

The method of preparing glass-fiber filter tubes in general is well known and typically comprises dispersing the fibers in an aqueous solution to form an aqueous-fiber slurry, forming the fibers into a filter tube, such as by forming a wet mat of the fibers about the external surface of a cylindrical vaccum mandrel, removing excess water after such tube formation, and drying the fibers on the filter tube mandrel. The dry filter tube is impregnated with a solution of the selected bonding agent, and, thereafter, heated to drive off solvents and to dry or, with thermosetting resins, to cure the bonding agent.

I have discovered that filter tubes of improved burst strength and other properties may be prepared by impregnating the filter tube with an aqueous emulsion or dispersion of the desired bonding agent, and coagulating the emulsion or dispersion particles in the impregnated tube prior to heating the tube to fuse or cure the coagulated bonding agent therein.

Although emulsions of polymeric bonding agents may be used to impregnate filter tubes, I have found that subsequent heating of the impregnated filter tube to evaporate the water permits migration of the polymeric bonding agent within the impregnated filter tube. Filter tubes so prepared have a nonuniform segregation of the bonding agent within the wall of the filter tube. Filter tubes so prepared result in filter tubes of low burst strength. Coagulation of the dispersed particles of the emulsion in place in the impregnated filter tube inhibits and prevents the coagulated bonding agent particles from moving with the continuous aqueous phase during the subsequent heating of the filter tube. In practice, as the water (the continuous phase) evaporates from the outer surfaces of the filter tube, the dispersed particles move with the water, resulting in a nonuniform concentration of the bonding agent, with a greater concentration toward the outer peripheral wall surface of the filter tube. My invention provides for coagulation of the bonding agent particles generally immediately after impregnation and before heating, to evaporate the water to provide for a more uniform concentration of the bonding agent throughout the wall depth of the tube at the fiber crossover junctions. In one preferred embodiment, a filter tube with a fluorocarbon resin bonding agent is prepared from an emulsion of the resin by coagulation of the resin from the emulsion. However, my process may be employed with a wide variety of polymeric bonding agents and prior-art resins.

Coagulation of the emulsion particles in the filter tube (that is, either the solid- or liquid-dispersed particles of the discontinuous phase of the aqueous emulsion or dispersion) can be accomplished by a variety of mechanical or chemical techniques. Such techniques include, but are not limited to: rapid heating to destabilize the emulsion, such as by the heating of the impregnated filter tube in a microwave oven; lowering the temperature of the emulsion to destabilize the emulsion, such as by freezing the emulsion in the tube; the use of chemicals to destabilize the emulsion, such as the change in pH, for example, by the use of acids and acid salts or chemicals to change or neutralize any charge distribution in the emulsion; and other techniques, alone or in combination. The particular and most effective method of coagulation by destabilization often depends on the type and nature of the emulsion. For example, many commercial latex emulsions are formulated to exhibit high emulsion stability, and often contain excess surfactant, pH-buffering agents and additives to improve the freeze/thaw stability of the emulsions, such as alcohols or glycols like ethylene glycol, propylene glycol, methyl alcohol, iropropyl and the like, or combinations of such additives.

Thus, the method of coagulation should be selected to be that technique which will coagulate effectively the dispersed particles in the most effective and economic manner for the particular emulsion to be used in the process.

In another embodiment of my invention, a filter tube, having a fluorocarbon resin bonding agent, is prepared by impregnating, such as by immersing, the filter tube in an emulsion of a thermoplastic, fusible, fluorocarbon resin, the resin particles being coagulated, and the filter tube, with the impregnated coagulated resin particles, then heated to a high fusing temperature; for example, above about 300° F., to fuse the inert fluorocarbon resin at or about the junction of the fiber crossover points within the tube. If desired, the coagulated filter tube may be dried and then fused, or the drying and fusing may take place essentially in a single operation.

The drying of the latex-impregnated, coagulated filter tube may be carried out at a temperature and for a time sufficient to drive off substantially all of the water of the latex emulsion; for example, in a steam oven at a temperature of 200° F. to 240° F. or higher for thirty minutes to six hours. Thereafter, the coagulated fluorocarbon resin, uniformly dispersed within the filter tube, is fused by heating the filter tube to a temperature above the crystalline melting or fusing temperature of the fluorocarbon resin employed; for example, to a temperature above 340° F., and more particularly heating in an oven to oven temperature above about 400° F., for a period of time sufficient to permit the thermoplastic resin to become fused, and, thereafter, cooling and recovering for use the filter tube with the fused bonding agent. The filter tubes so prepared have improved burst strength over those filter tubes prepared in the same manner without the coagulation step. Such improved filter tubes have a burst strength of greater than 25 psi, and typically over about 45 psi to 80 psi. The filter tubes with the fused bonding agent are also desirable in that they exhibit chemical inertness and may be used for the filtration of halogens, such as liquid chlorine.

In a further embodiment of my invention, filter tubes of significantly high burst strength are prepared by my process, wherein the filter tube includes, integrally and cooperatively bonded therein, an open-mesh-type reinforcing sheet material particularly as a helical coil within the wall depth of the filter tube. I have discovered that my process, when employed with filter tubes containing an open scrim material, particularly a glass-fiber mesh material, as a helical coil in the filter tube, and with the fused fluorocarbon resin as a bonding agent, provides for filter tubes with burst strengths in excess of 100 psi, without the need or requirement for separate external supports up to the burst strength of the tube. In particular, it has been discovered that cooperative bonding by the bonding agent of the glass fibers through a coiled scrim material; for example, in the manner as set forth in U.S. patent application Ser. No. 679,569, supra, now provides filter tubes of unexpected and significantly high burst strength. Such filter tubes may be employed directly on commercial air-compressor lines operating at 125 psi without bursting.

In my process, the employment of an aqueous emulsion of the bonding agent, rather than an organic or other solvent solution of the same resin bonding agent, is desirable, since the discharge of organic solvents is avoided, together with the problems associated with the storing and handling, as well as fire-explosion hazards, of such solvents. The use of aqueous emulsions of resin or polymeric bonding agents, either of the thermoplastic or the curable type, in my process thus avoids the use of more expensive organic solvent solutions of the resin. In addition, where fluorocarbon or vinyl-polymerized resins are used, it is often difficult to obtain or prepare such resins in acceptable or common organic solvents. Such solvents often are expensive, tend to form azeotropes easily and represent toxicity and handling problems. The fluorocarbon emulsion employed has a finely-divided dispersion of the fluorocarbon resin particles of typically less then 1 micron; for example, less than 0.4 or smaller primary particle size in the emulsion, to permit sufficient and rapid penetration of the dried filter tube to be impregnated.

The fluorocarbon resins useful as fusible bonding agents in the preparation of the one embodiment of my improved filter tube comprise those high-molecular-weight crystalline vinylidene halogens, such as fluoride polymers, and more typically include the homopolymers of vinylidene fluoride and the copolymers of vinylidene halides with haloethylene, such as, for example, the copolymers of vinylidene fluoride and tetrafluoroethylene. The preferred fluorocarbon resins employed are thermoplastic resins capable of being fused when heated to a high temperature, and particularly having melt temperature over 300° F. Such fluorocarbon resins are dispersed and employed as aqueous latex emulsions, wherein the resin particles are dispersed in emulsions at about 15% to 25% solids, and with about 0.3 to 0.4 microns average particle size, and with an anionic particle charge. Such fluorocarbon resins have a crystalline melting point, which is exceeded in fusing the resin.

Such fluorocarbon resins employed as binders in my improved filter tubes provide filter tubes of improved burst strength and high-temperature and chemical-inertness properties. Such tubes may be used to filter materials which cannot be filtered satisfactorily with prior-art filter tubes containing thermosetting or curable organic resins. For example, my improved filter tubes, wherein the bonding agent is composed of a homopolymer of vinylidene, may be employed satisfactorily in the filtration of chlorine-containing solutions, such as liquid chlorine.

In the most preferred embodiment, my improved filter tube is prepared by immersing a dry, glass-fiber filter tube, containing therein a helically wound coil of an open-mesh, glass fiber scrim material, through which open-mesh material the glass fibers extend, after removal from the vacuum mandrel, into the aqueous emulsion of the resin bonding agent, such as the fluorocarbon resin emulsion, to permit the latex to impregnate into the filter tube. The impregnated emulsion is then coagulated, such as by freezing, and, thereafter, the process includes fusing the coagulated fluorocarbon resin. After fusing and cooling, the amount of the fluorocarbon resin bonding agent in my improved filter tube provides a self-supporting, semirigid filter tube which is capable of being compressed at its ends to form a self-sealing gasket. The amounts of bonding agent may vary, and often range from about 2% to 40% by weight of the filter tube, such as from about 3% to 18% by weight of the filter tube.

The filter tube so prepared has a very high burst strength and chemical inertness, and comprises a plurality of nonwoven glass fibers, a fused fluorocarbon resin bonding agent generally uniformly distributed throughout the filter tube, and a helically coiled reinforcement scrim material within the tube walls, with the fibers of the porous filter tube and the scrim material being in intimate cooperative bonding contact. The scrim material may comprise also a concentrically arranged integral sleeve about the external or internal surface of the filter tube. The support material comprises a material which is not adversely affected by the high fusing temperatures of the fused fluorocarbon resin, with one preferred material being an open-mesh, glass-fiber material.

In the preparation of an externally supported filter tube of my invention, a sleeve-like, external reinforcing or supporting element, having an internal diameter slightly in excess of the external diameter of the filter tube, is placed in a concentric arrangement over the filter tube, particularly over the filter tube after removal from the slurry and while on the vacuum mandrel, and then the tube is dried, whereby the wet glass fibers tend to move outwardly and to come into intimate contact with and to mingle with and through the surrounding support screen. When the filter tube is impregnated with the bonding agent and is heated to the fusing or curing temperature, the filament screen is fused about and to the surrounding surface of the glass fibers.

My invention will be described for the purpose of illustration only, and particularly in connection with the preparation of a self-supporting, semirigid, borosilicate glass-fiber, fused, fluorocarbon resin-bonded filter tube.

DESCRIPTION OF THE EMBODIMENTS

EXAMPLE 1

A filter tube of my invention is prepared by preparing a slurry of glass fibers of about ½% by weight in water, the glass fibers having a diameter of approximately 0.2 to 3.8 microns, primarily 2.6 to 2.8 microns. A wet slurry of the glass fibers is formed on a vacuum-type, cylindrical mandrel, with a screen surface, into a filter tube, excess water is removed by suction, and the tube is then racked and dried in a steam oven. If desired, a porous, external, open-mesh, support sleeve may be slipped about the external diameter of the vacuum mandrel before drying, so that, on drying of the glass fibers and outward expansion of the glass fibers, the fibers may be forced into intimate contact with the surrounding external support screen. For example, open-mesh screen ⅛th inch to ½ inch glass fibers may be used.

After formation, the tube; for example, of 1 inch inside diameter and a wall thickness of about ⅛th inch, is removed from the mandrel and is immersed in an emulsion of a polyvinylidene fluoride resin. The emulsion contains about 10% by weight of the resin, the resin having a primary particle size of from about 0.3 to 0.4 microns. After immersion and impregnation, the impregnated filter tube is removed and immediately is placed in a freezer to freeze the emulsion and to effect coagulation of the resin particles in the filter tube. After freezing or destabilizing the emulsion, the filter tube is then heated to a fusing temperature by placing it into an oven at a temperature of approximately 400° F. for about 15 minutes; for example, 15 to 60 minutes, to fuse the resin. After fusion, the tube is cooled and then cut into the desired lengths for use. A filter tube so prepared has been usefully employed in the filtration of liquid chlorine.

A similar filter tube was prepared without the coagulation of the resin particles by freezing and the burst strengths of the tubes were compared. It was found that the burst strength of the noncoagulated tube was better than prior-art tubes, and ranged from 40 to 45 psi, while the burst strength of the coagulated filter tube, both with and without any supporting scrim, was much higher—over 50 psi, and typically 70 to 80 psi.

EXAMPLE 2

Example 1 was repeated. However, coagulation of the resin particles was effected by placing the impregnated filter tube in a household microwave oven to heat rapidly the impregnated filter tube.

EXAMPLE 3

Example 1 was repeated, except that, on formation of the filter tube, an open-mesh, glass-fiber material was placed on top of a wet mat of the dispersed glass fibers in a generally middle position on the mat from either end of the wet mat. The mesh material was composed of glass fibers of about ⅛th to ¼th of an inch in mesh opening, the glass fibers retained in place by a water-soluble starch finish. On formation of the wet mat, by rolling the mandrel over the mat to wind up the wet mat on the mandrel, the scrim material was positioned integrally within the wall of the formed filter tube as a helical coil, with no scrim material on the external or internal surface of the tube, the scrim extending the length of the formed tube. On removal of the water, the glass fibers were drawn through the open-mesh spaces and were intimately mixed with the glass fibers of the scrim. The starch finish dissolved during the formation of the filter tube. The formed scrim-containing tube was then immersed in the emulsion, the resin coagulated, and the coagulated resin was fused and cooled, as in Example 1.

The filter tube, when tested for burst strength, was unburstable at pressures of up to 125 psi, the pressure of the air compressor employed in the burst-strength test.

Thus, in summary, general prior-art, resin-bonded, glass-fiber filter tubes have a burst strength of up to 25 psi (for example, with silicone resin bonding agents and a solvent-solution method of preparation), while such filter tubes, with helically wound scrim materials, are improved in burst strength to as high as 45 to 55 psi. However, my process provides for inert filter tubes with fused fluorocarbon resin bonding agents having burst strengths of up to about 80 psi without scrim reinforcement, and over 125 psi with helical scrim reinforcement.

My process has been described in particular with the use of a fluorocarbon resin emulsion. However, any emulsion of a bonding agent may be employed usefully in my process to prepare improved filter tubes, such as, for example, polymeric emulsions of other thermoplastic, thermosetting and cross-linkable materials, such as phenol-formaldehyde resins, epoxy resins, silicone resins, urethane resins, polyester resins, etc.

My filter tubes have been prepared with glass fibers. However, filter tubes, which contain other natural or synthetic fibers, such as inorganic fibers like alumina or zirconia filters or admixtures thereof, may be used. If desired, the open-mesh scrim or reinforcing materials may be used and may be bonded integrally within or to the internal or outer surface of the filter tube. It is recognized that other changes and modifications to the embodiments described may be made by those persons skilled in the art, which are within the spirit and scope of my invention.

What I claim is:

1. An improved filter tube, which filter tube comprises interrelated, randomly disposed, inorganic fibers having interstices therebetween to define the porosity of the filter tube, the fibers having a diameter ranging from about 0.01 to about 10 microns, and bonded at the junction of the fiber crossover points in the filter tube, with a bonding agent consisting essentially of a fused, thermoplastic, fluorocarbon polymer, the bonding agent generally uniformly distributed throughout the thickness of the filter tube wall and present in an amount of from about 3% to 40% by weight of the tube, the fibers interrelated to form a porous, self-supporting filter tube.

2. The filter tube of claim 1 wherein the fibers are composed of borosilicate glass fibers having a diameter ranging from about 0.03 to about 8 microns.

3. The filter tube of claim 1 wherein the glass fibers have a diameter of from about 0.5 to 5 microns.

4. The filter tube of claim 1 wherein the thermoplastic fluoride polymer comprises a homopolymer of vinylidene fluoride.

5. The filter tube of claim 1 wherein the thermoplastic fluoride polymer comprises a copolymer of vinylidene fluoride and tetrafluoroethylene.

6. The filter tube of claim 1 wherein the fluorocarbon polymer has a crystalline melt temperature greater than about 300° F.

7. The filter tube of claim 1 which includes an external, open-mesh-like, scrim element about the external diameter of the filter tube and internally bonded in the outer wall of the filter tube.

8. The filter tube of claim 1 which includes a helically coiled, open-mesh-like, scrim element extending generally the length of the tube and within the wall of the filter tube, the scrim element integrally and cooperatively bonded to the fibers of the tube.

9. The filter tube of claim 8 wherein the scrim element comprises a generally uniform mesh element of glass fibers, the scrim element solely within the wall of the filter tube.

10. The filter tube of claim 8 which has a burst strength of greater than 100 psi.

11. An improved filter tube of high burst strength, which filter tube comprises interrlated, randomly disposed, inorganic glass fibers having interstices therebetween to define the porosity of the filter tube, the glass fibers having a diameter ranging from about 0.01 to about 10 microns, and bonded at the junction of the fiber crossover points in the filter tube, with a bonding agent consisting essentially of a coagulated, fused, thermoplastic vinylidene fluoride polymer, the bonding agent generally uniformly distributed throughout the thickness of the filter tube wall and present in an amount of from about 3% to 40$ by weight of the tube, the glass fibers interrelated to form a porous, self-supporting filter tube, the filter tube containing a helical coil of an open-mesh-like scrim element extending generally the length of the filter tube and within the filter tube wall, the helically coiled scrim element integrally and cooperatively bonded to the glass fibers of the tube.

12. The filter tube of claim 11 which includes an external, mesh-like, sleeve element about the external diameter of the filter tube, which sleeve element is integrally and cooperatively bonded to the external wall surface of the filter tube.

* * * * *

UNITED STATES PATENT AND TRADEMARK OFFICE
CERTIFICATE OF CORRECTION

PATENT NO. : 4,210,540

DATED : July 1, 1980

INVENTOR(S) : Kenneth A. Perrotta

It is certified that error appears in the above-identified patent and that said Letters Patent is hereby corrected as shown below:

On the cover sheet, under the "Related U.S. Application Data" delete "Pat. No. 4,102,785" and insert therefor —U.S. Pat. No. 4,169,754—.

Signed and Sealed this

Twenty-third Day of August 1983

[SEAL]

Attest:

GERALD J. MOSSINGHOFF

Attesting Officer

Commissioner of Patents and Trademarks